United States Patent [19]

Galletti

[11] Patent Number: 4,668,119
[45] Date of Patent: May 26, 1987

[54] COUPLING FOR CONNECTING METAL TUBES END-TO-END, PARTICULARLY IN MARINE PILINGS

[75] Inventor: Cesare Galletti, S.Felice Di Segrate, Italy

[73] Assignee: Innse Innocenti Santeustacchio S.p.A., Brescia, Italy

[21] Appl. No.: 748,584

[22] Filed: Jun. 25, 1985

[30] Foreign Application Priority Data

Jun. 29, 1984 [IT] Italy .............................. 21687 A/84

[51] Int. Cl.[4] .......................... B25G 3/16; F16B 7/20
[52] U.S. Cl. .................................... 403/349; 403/343; 405/251
[58] Field of Search ...................... 403/348, 349, 343; 285/391; 405/251, 252

[56] References Cited

U.S. PATENT DOCUMENTS

| 1,337,371 | 4/1920 | Richards | 285/391 X |
| 3,585,803 | 6/1971 | Bardgette | 403/251 |
| 4,094,539 | 6/1978 | Reimert | |
| 4,185,856 | 1/1980 | McCaskill | 403/349 X |

Primary Examiner—Andrew V. Kundrat
Attorney, Agent, or Firm—Fleit, Jacobson, Cohn & Price

[57] ABSTRACT

A coupling for connecting together two metal tubes end-to-end comprises a male half-coupling and a female half-coupling respectively attached to opposite ends of the tubes to be connected and made fast with each other through first and second annular connectors, respectively rigid with the male half-coupling and female half-coupling and coupled together in substantially bayonet-joint relationship. Such a coupling is specially suited to the formation of marine pilings for supporting offshore platforms.

2 Claims, 2 Drawing Figures

COUPLING FOR CONNECTING METAL TUBES END-TO-END, PARTICULARLY IN MARINE PILINGS

BACKGROUND OF THE INVENTION

This invention relates to a coupling for connecting metal tubes end-to-end to form tubular piles for use in pilings, in particular marine pilings for offshore platforms.

The invention is also concerned with a coupling of the type which comprises a male half-coupling and a female half-coupling attached to the ends of respective metal tubes and made fast with each other through clamping means.

In the implacement of marine pilings, with tubular metal piles of large diameters, comprising a plurality of metal tubes connected together end-to-end fashion, it is of special import that couplings be provided at the ends of said tubes which can be tightened and if need be loosened in a particularly quick and effective manner.

The coupling fast tightening feature is made necessary by the high hourly cost of the equipment involved in implacing the piling, whilst the need for effective tightening, and specifically the possibility of developing an axial preload between the male and female half-couplings, is imposed by the tubular piling implacement technology.

One example of couplings useful in the implacement of tubular piling is disclosed in U.S. Pat. No. 4,094,539 of June 13, 1978.

That coupling comprises male and female half-couplings: the female half is provided with a plurality of latches which are movable radially independently of one another to and from the male half. That end of each of the latches which is laid facing the male half-coupling is cut to profile with one or more teeth adapted to engage with one or more annular grooves formed on the male half. The contact surfaces of the latch teeth and corresponding annular grooves are tapering surfaces, thereby an advantageous axial preload action is developed in fitting the coupling halves together.

In view of the large diameter of a pile intended for driving into the sea bottom, a tight coupling of the tubes comprising it dictates the availability of a large number of latches for independent operation of one another.

As a consequence, the coupling closing and/or opening operation is time-consuming, while the axial preload aimed at between the coupling halves is inaccurate and unevenly applied, especially because the radial tightening stresses at each latch are adjusted independently of one another.

SUMMARY OF THE INVENTION

The problem underlying this invention is that of providing a coupling for connecting metal tubes end-to-end, which has such structural and functional characteristics as to overcome the problems affecting the aforementioned prior art.

The problem is solved by a coupling as indicated in which the clamping means comprises first and second annular connectors mounted coaxially externally of the male half-coupling and internally of the female half-coupling, respectively, and set rotatable relatively to each other and fitting removably together in bayonet-like relationship.

BRIEF DESCRIPTION OF THE DRAWINGS

The features and advantages of the invention will be more readily understood from the following detailed description of a preferred embodiment of the inventive coupling, with reference to the accompanying illustrative and not limitative drawings, where.

DESCRIPTION OF THE PREFERRED EMBODIMENT

Figure 1:
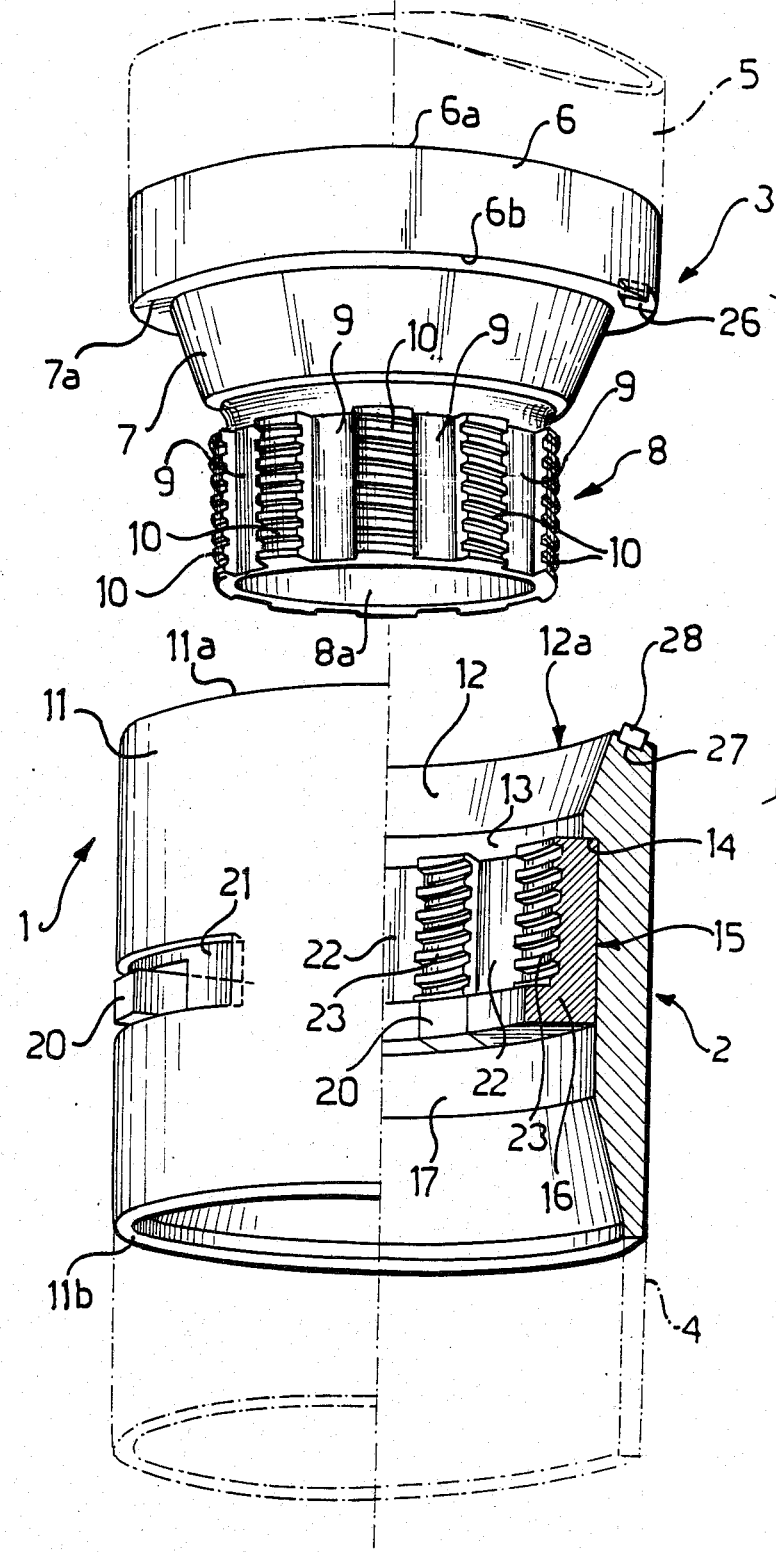
FIG. 1 is a perspective view of a male half-coupling and a female half-coupling, the latter being shown partly in section, which form a coupling according to this invention.
Figure 2:
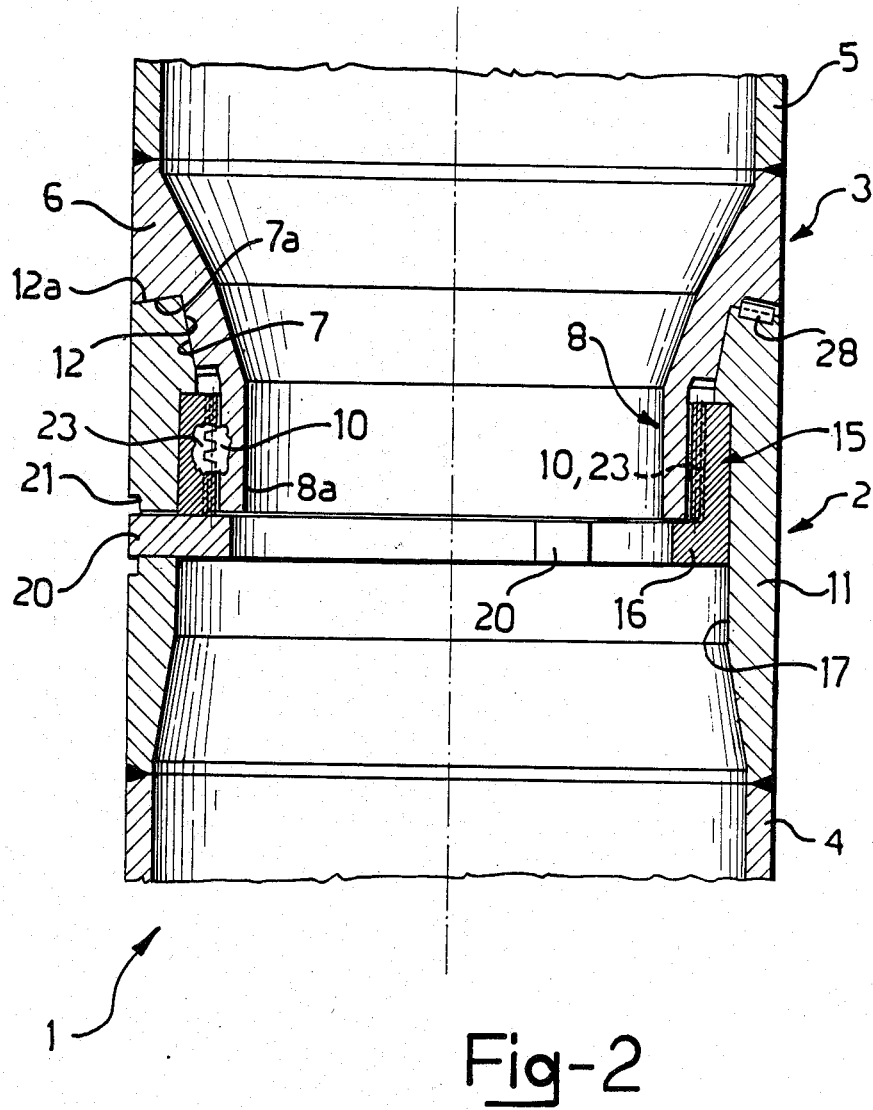
FIG. 2 is an axial section view of the same coupling as in FIG. 1, with the coupling halves in the connected condition.

In the drawing figures, the numeral 1 designates generally a coupling according to the invention, for connecting together end-to-end two metal tubes 4 and 5, shown in dash-and-dot lines.

The metal tubes 4 and 5 form a part of a tubular pile intended for forming a bearing piling for a marine drill platform, not shown.

The coupling 1 consists of a tubular female half-coupling 2 welded to the end of the tube 4 coaxially therewith, and of a tubular male half-coupling 3 welded to the end of the tube 5 coaxially therewith.

The male half-coupling 3 comprises a first annular section 6 of cylindrical shape which has substantially the same diameter dimension as the outside diameter of the tube 5; a second annular section 7 of frusto-conical shape and tapering outwardly to define, together with said first tubular section 6, an annular shoulder 7a. This annular shoulder 7a is of conical shape tapering in the opposite direction to the section 7 above. A keyway 26 is formed in said shoulder 7a. A third section 8 of said half-coupling 3 is cylindrical and has an outside diameter which is substantially equal to the least diameter on the frusto-conical section 7. The outer surface of this third section 8 is threaded with a trapezoidal thread and fluted with a plurality of axial grooves 9 defining a corresponding plurality of ribs 10 formed outwardly with said thread.

This tubular section 8 forms a first annular connector, as explained hereinafter.

The female half-coupling 2 comprises a cylindrical tubular body 11 adapted for end welding to the tube 4. The edge 11a of the free end of said tubular body 11 is conically shaped and provides an abutment surface for the conical shoulder 7a of the male half-coupling 3. Secured in a keyway 27 formed in said edge 11a is a key 28 adapted to engage with the keyway 26 on the annular shoulder 7a.

In the tubular body 11, from the free end thereof, there are formed coaxially a conical section 12 (complementary to the frusto-conical section 7 of the male half-coupling 3) and a cylindrical section 17 having a greater inside diameter than the least inside diameter of the conical section 12. Formed between 12 and 17 is an annular shoulder 14.

The cylindrical section 17 forms a seat for receiving a cylindrical ring nut 16 retained coaxially rotatable at a position against the annular shoulder 14, as explained herein below.

Externally of the ring nut 16, there are attached a plurality of pegs 20 extending radially through windows 21 cut in the tubular body 11 with respect to which they extend circumferentially.

The pegs 20 constitute handling pieces for rotating the ring nut 16. It should be noted that the circumferential length of each of said windows 21 is selected for a preset angular displacement of the ring nut 16 about the axis of the inventive coupling, as explained more clearly hereinafter.

The inner surface of the ring nut 16 is threaded with a trapezoidal thread and fluted with plural axial grooves 22 defining a corresponding plurality of ribs 23, affected on the outside by said thread formation.

The ring nut 16 so structured forms a second annular connector according to the invention.

It should be noted that the axial grooves 22 of the ring nut 16 have a circumferential length which is substantially equal to that of the ribs 10 of the tubular section 8, on the male half-coupling 3, wherewith they are adapted to engage; the axial grooves 9 on the tubular section 8 have substantially the same circumferential length as the ribs 23 of the ring nut 16, wherewith they are adapted to engage. It should be further noted that the threads of the cited section 8 and of the ring nut 16 are mating threads.

The connection of any two tubes (such as 4 and 5) using a coupling according to the invention is accomplished as follows.

A tube (5) provided at one end with a male half-coupling (3) is held suspended in axial alignment over a tube (4) provided at its end with a female half-coupling (2). The male half 3 is brought to face the female half-coupling 2. By operating the pegs 20, the ring nut 16 is oriented in such an angular position as to have the grooves 22 and ribs 23 thereon aligned respectively to the ribs 10 and grooves 9 of the male half-coupling 3. Now, the tube 5 is lowered to cause the malf half-coupling 3 provided on it to bottom out into the female half-coupling 2. Thereupon, the ribs 10 of the cylindrical section 8 (first annular connector) will engage axially in the grooves 22 of the ring nut 16 (second annular connector), while the annular shoulder 7a of the male half-coupling comes to bear on the conical edge 11a of the female half-coupling.

By acting on the pegs 20, the ring nut 16 is presently shifted angularly about the axis of the tubes 4 and 5 to cause the threaded portions of the ribs 10 and 23 to engage (thread) together. Thus, there is formed between the half-couplings 2 and 3 a substantially bayonet-like joint, with an even distribution of the tightening preload of the inventive coupling. It is specially important that a compressive stress be induced between the abutment surface 11a and the shoulder 7a, because the stress imposed by the hammer used to drive the pile into the sea bottom would be transferred thereto.

I claim:

1. A coupling for connecting metal tubes end-to-end, said coupling comprising two tubes forming a tubular bearing pile for use in marine pilings, each tubular pile having one of male and female half-couplings attached to the ends of said two tubes, said male half-coupling includes an annular shoulder diverging towards its free end adjacent a portion of said male half-coupling converging towards its free end, said female half-coupling includes an edge on the end opposite said attached metal tube, said edge providing a complementary abutment surface for said annular shoulder, first and second annular connectors mounted coaxially on the exterior of the male half-coupling and interior of the female half-coupling, respectively, said first and second annular connectors being rotatable relatively to each other and fitted to each other in substantially bayonet-like relationship, said first annular connector comprises a cylindrical tubular section threaded externally and formed coaxially in said male half-coupling, a plurality of grooves formed axially in said cylindrical tubular section and defining a corresponding plurality of axial ribs therein, said second annular connector comprises an inside threaded ring nut mounted for rotation coaxially within said female half-coupling, a plurality of grooves formed axially in said ring nut and defining a corresponding plurality of axial ribs therein, said axial ribs of said ring nut extending substantially over the same length as said axial grooves of said cylindrical tubular element and said axial grooves of said cylindrical tubular section extending over the same length as said axial ribs of said ring nut, and displacement means for displacing said ring nut angularly about the axis of said coupling for uniform distribution of axial tightening preload between coupling halves upon displacement of said displacement means to produce a comprehensive stress between said annular shoulder and said edge of said female half-coupling.

2. A coupling according to claim 1, wherein said displacement means comprises a plurality of pegs secured radially to the exterior of said ring nut, and a corresponding plurality of windows cut circumferentially in said female half-coupling, said pegs extending through said windows and being guided movably therein.

* * * * *